(12) United States Patent
Mitrovic

(10) Patent No.: US 7,104,918 B2
(45) Date of Patent: Sep. 12, 2006

(54) COMPACT EPICYCLIC GEAR CARRIER

(75) Inventor: Lazar Mitrovic, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 196 days.

(21) Appl. No.: 10/628,573

(22) Filed: Jul. 29, 2003

(65) Prior Publication Data

US 2005/0026745 A1 Feb. 3, 2005

(51) Int. Cl.
*F16H 57/06* (2006.01)

(52) U.S. Cl. .................................. 475/331; 475/346
(58) Field of Classification Search ............... 475/331, 475/346

See application file for complete search history.

(56) References Cited

U.S. PATENT DOCUMENTS

| | | |
|---|---|---|
| 3,257,869 A | 6/1966 | Sharples |
| 3,527,121 A | 9/1970 | Moore |
| 3,635,103 A | 1/1972 | Monti |
| 3,654,815 A | 4/1972 | Dehne |
| 3,842,481 A | 10/1974 | Laing |
| 3,939,736 A | 2/1976 | Morin |
| 3,943,780 A | 3/1976 | Klaue |
| 4,129,050 A | 12/1978 | Akashi et al. |
| 4,282,776 A | 8/1981 | Eller |
| 4,329,130 A | 5/1982 | Nagata et al. |
| 4,586,401 A | 5/1986 | Nogle |
| 4,793,214 A | 12/1988 | Nurnberger et al. |
| 4,854,184 A | 8/1989 | Jessup |
| 4,983,152 A | 1/1991 | Kimberlin et al. |
| 5,136,197 A | 8/1992 | Hallett |
| 5,237,885 A | 8/1993 | Putney et al. |
| 5,309,714 A | 5/1994 | Putney et al. |
| 5,382,203 A * | 1/1995 | Bellman et al. ............ 475/331 |
| 5,466,198 A | 11/1995 | McKibbin et al. |
| 5,470,286 A | 11/1995 | Fan |
| 5,152,726 A | 4/1996 | Lederman |
| 5,649,254 A | 7/1997 | Mori et al. |
| 5,679,089 A | 10/1997 | Levedahl |
| 5,928,105 A * | 7/1999 | Taha et al. .................. 475/331 |
| 6,148,605 A | 11/2000 | Lardellier |
| 6,394,387 B1 | 5/2002 | Mitrovic |
| 6,422,971 B1 | 7/2002 | Katou et al. |
| 6,663,530 B1 * | 12/2003 | Poulin et al. ............... 475/331 |
| 2003/0008748 A1 | 1/2003 | Fox |

FOREIGN PATENT DOCUMENTS

| | | |
|---|---|---|
| DE | 197 06 686 | 8/1998 |
| EP | 0 229 958 | 7/1987 |
| EP | 271 416 | 6/1988 |
| EP | 0 618 383 | 10/1994 |
| EP | 0 989 316 | 3/2000 |
| EP | 1 028 275 | 8/2000 |
| EP | 1 267 095 | 12/2002 |
| GB | 725 364 | 3/1955 |
| GB | 1 420 965 | 1/1976 |
| JP | 358061982 | 4/1983 |
| JP | 358156773 | 9/1983 |
| JP | 407332475 | 12/1995 |
| JP | 408270739 | 10/1996 |

* cited by examiner

*Primary Examiner*—Dirk Wright
(74) *Attorney, Agent, or Firm*—Ogilvy Renault LLP

(57) ABSTRACT

An epicyclic gear carrier assembly for use in an epicyclic gear train of a gas turbine engine, the epicyclic gear train having a central axis and a plurality of epicyclic gears rotatable about individual gear axes. The epicyclic gear carrier assembly comprises at least a carrier plate defining a plurality of circumferentially spaced axle bores which are disposed radially outward from the central axis and are co-axial with the individual gear axes. A plurality of corresponding gear axles are disposed within the axle bores, and the plurality of epicyclic gears are rotatably mounted to the gear axles via bearing elements. An epicyclic carrier member comprises a plurality of axle engaging elements that are co-axial with the gear axles and are engaged thereto by load transmission members such that load is transferred from the gear axles to the epicyclic carrier member.

21 Claims, 5 Drawing Sheets

COMPACT EPICYCLIC GEAR CARRIER

TECHNICAL FIELD

The present invention relates generally to epicyclic gearboxes, more particularly, to a more compact gear carrier in an epicyclic gearbox.

BACKGROUND OF THE INVENTION

Epicyclic gearboxes are well known and are frequently used for their compact design and efficient high transmission ratio capabilities which is particularly useful in the environment of gas turbine engines. Epicyclic gear trains are also advantageous due to their versatility. Planetary and star gear trains are alternate arrangements used in epicyclic gearboxes. Both generally comprise three gear train elements: a central sun gear, an outer ring gear, and a plurality of planet gears supported by a planet carrier between and in meshing engagement with both the sun gear and the ring gear. A rotary input can be connected to any one of the three elements. Holding one of the remaining two elements stationary with respect to the other two, permits the third to serve as an output. In planetary gear trains, the central sun gear provides the input, the outer ring gear is held stationary, and the planet gears that rotate therewithin cause their planet carrier to rotate, which provides the reduced speed rotary output. In star gear trains, the sun gear provides the input. However, the planetary carrier is held stationary, and the outer ring gear provides the rotary output in a direction opposite that of the input sun gear.

While conventional epicyclic gear trains are significantly compact, particularly in relation to their high gear reduction capabilities, in relation to other types of gear trains, potential improvements remain possible in order improve the compactness of such gear train arrangements.

Further, certain shortcomings exist with known epicyclic drive trains. For example, as with many mechanical elements that transfer torque, a small but nevertheless significant amount of torsional deflection commonly occurs due to the elasticity of the material of the carrier, as a result of twist between upstream and downstream plates of the gear carrier, when the gear train is under load. The gear carrier generally twists around its central axis, causing the individual axis of rotation of the gears to lose parallelism with the central axis of the gear carrier. This torsional deflection results in misalignment at gear train bearings and at the gear teeth mesh, which leads to efficiency losses and reduced life of the parts.

Attempts to address this problem of planetary carrier torsional deflection are known. U.S. Pat. No. 5,466,198 issued Nov. 14, 1995 to McKibbin et al, for example, clearly sets out the problem and proposes a planetary gear train drive system which isolates the planetary carrier from torsional deflections. A torque frame or torque transfer structure is connected to a rotating load, such as a bladed propulsor. Pivotal joints, circumferentially disposed with respect to the carrier, each pivotable about a radial axis, connect axially extending arms of a torque frame to the planetary carrier. The pivotal joints permit the planetary carrier to be isolated from torsional deflections. However, further reductions in the torsional deflections resulting in the planetary carrier are possible.

There remains a need for a more compact epicyclic gear train arrangement that is capable of transferring torque while further reducing torsional deflections therewithin.

SUMMARY OF THE INVENTION

It is an object of the present invention to provide an improved epicyclic gear train having a compact arrangement of planet gears.

It is another object of the present invention to provide a planet gear carrier and torque transfer member having reduced torque induced twist.

Therefore, in accordance with the present invention, there is provided an epicyclic gear carrier assembly for use in an epicyclic gear train of a gas turbine engine, said epicyclic gear train having a central axis and a plurality of epicyclic gears rotatable about individual gear axes, said epicyclic gear carrier assembly comprising: at least a carrier plate defining a plurality of circumferentially spaced axle bores being disposed radially outward from said central axis and each axle bore being co-axial with said individual gear axes, a plurality of corresponding gear axles being disposed within said axle bores and each of said epicyclic gears being rotatably mounted to a corresponding gear axle via bearing elements; and an epicyclic carrier member comprising a plurality of axle engaging elements co-axial with said gear axles and engaged thereto by load transmission members such that load is transferred between said gear axles and said axle engaging elements while substantially bypassing said carrier plate.

There is also provided, in accordance with the present invention, an epicyclic gear carrier assembly comprising: at least one carrier plate defining a plurality of circumferentially spaced axle bores therethrough disposed radially outward from a central axis, a plurality of corresponding gear axles being disposed within said axle bores for rotatably supporting a plurality of epicyclic gears thereon; and an epicyclic carrier member comprising a plurality of axle engaging elements co-axial with said gear axles and engaged thereto by load transmission members such that load is transferred between said gear axles and said axle engaging elements while substantially bypassing said carrier plate.

There is further provided, in accordance with the present invention, an epicyclic gear carrier assembly for used in an epicyclic gear train of a gas turbine engine having a sun gear rotatable about a central axis, a ring gear, and a plurality of epicyclic gears each rotatable about an individual axis of rotation, said epicyclic gear carrier assembly comprising: a plurality of gear support means each having one of said epicyclic gears rotatably mounted thereto by bearing elements such that said gear support means are co-axial with said individual axis of rotation, said gear support means being engaged to at least one carrier plate; and an epicyclic carrier member having a plurality of circumferentially spaced gear engaging means which axially extend and are disposed radially outward from said central axis, each of said gear engaging means being co-axial with one of said gear support means and engaged thereto by a deflection isolating load transmission means, such that load is transferred between said gear support means and said gear engaging means while substantially bypassing said carrier plate.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
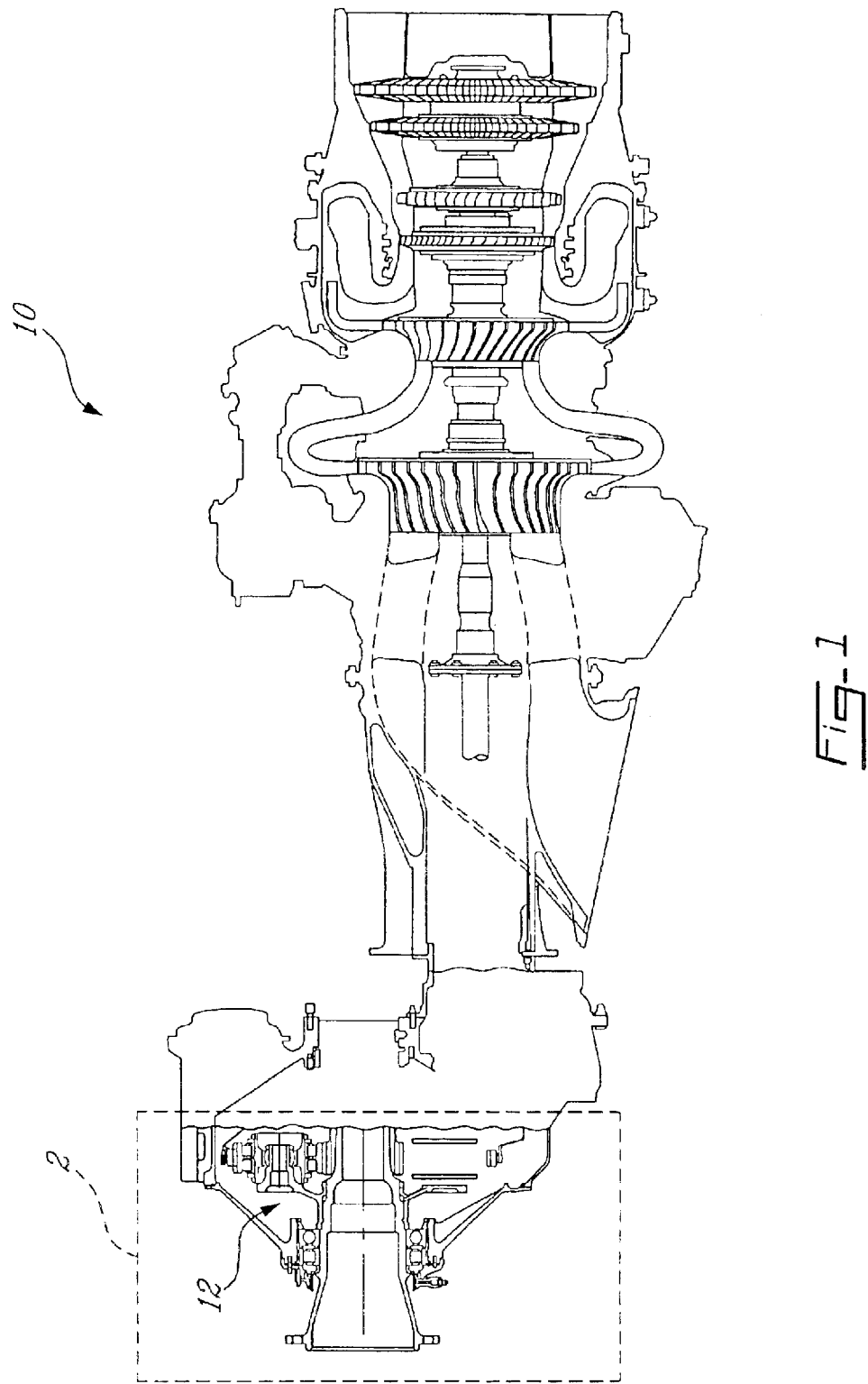
FIG. 1 is a schematic cross-sectional view of a gas turbine engine having an epicyclic gear carrier assembly according to the present invention.

In FIG. 1, a turboprop gas turbine engine is schematically depicted, comprising an epicyclic geartrain 12. The preferred embodiment of the present invention is particularly adapted for use in turboprop and turboshaft gas turbine engines, and may be used in split, offset or in-line gearboxes. Epicyclic geartrains are well known in gas turbine applications, and generally comprise a sun gear, a ring gear, and at least two carrier gears supported by an epicyclic carrier, all of which will be described in further detail below with reference to the present invention. Such epicyclic geartrains can comprise one or several stages, and generally have either a planetary or star arrangement. It will be understood herein that a planetary geartrain is an epicyclic geartrain wherein the outer ring gear is fixed in place, such that rotation of the sun gear causes the planetary gears to revolve within the outer ring gear, thereby rotating the planetary carrier supporting the circumferentially spaced planet gears. Depending on whether a rotational speed reduction or increase is desired, the sun gear can act either as input or output. By contrast, in a star geartrain arrangement, the carrier is held stationary, and the outer ring gear is permitted to rotate. Similarly, either the central sun gear or the outer ring gear can provide input to the epicyclic star geartrain.

Figure 2:
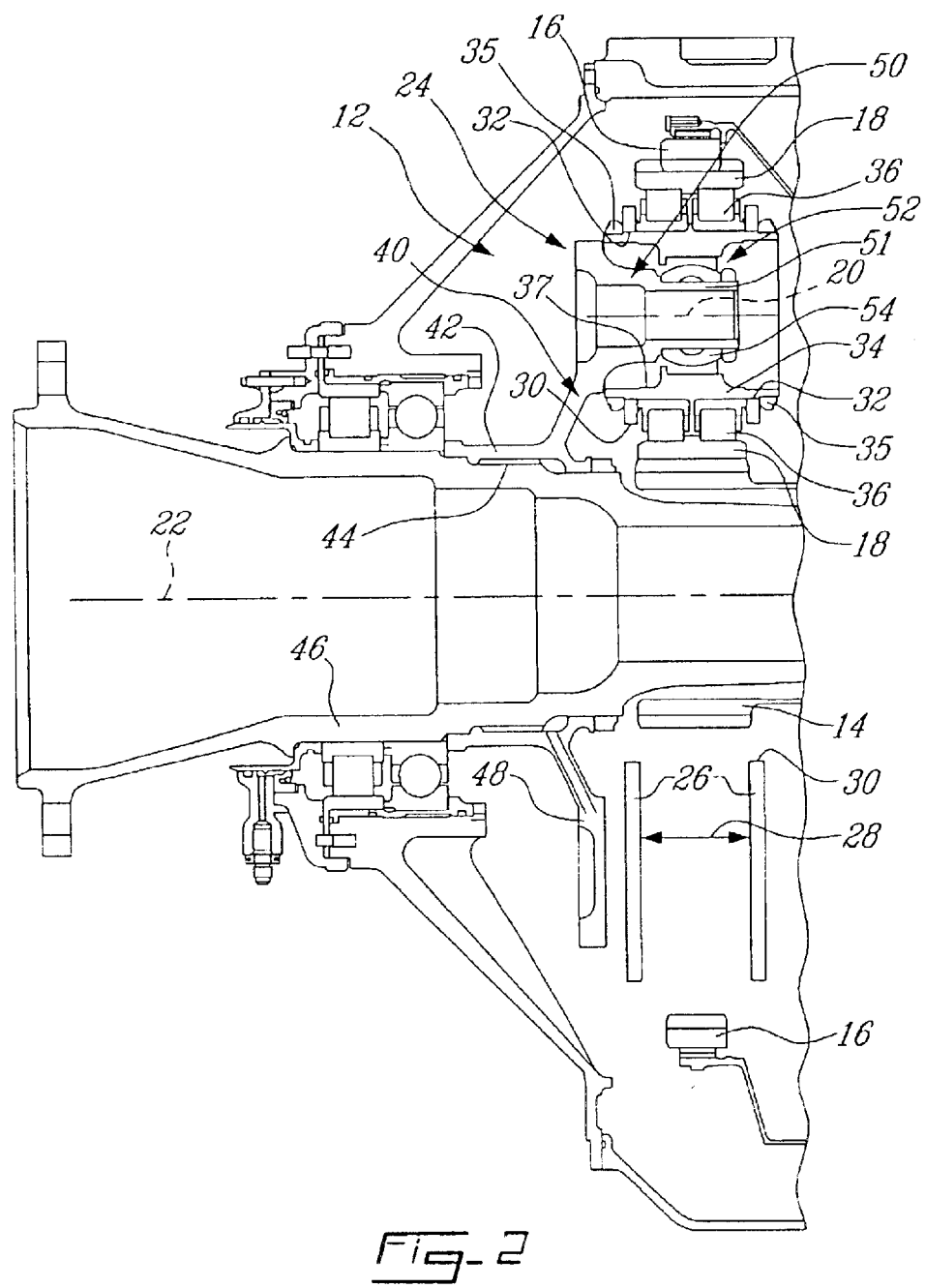
FIG. 2 is a detailed cross-sectional view of the epicyclic gear carrier assembly according to the present invention, taken from area 2 of FIG. 1.

The epicyclic geartrain as seen in FIG. 2 is a planetary geartrain 12 generally including a central sun gear 14, an outer ring gear 16, and a plurality of planet gears 18, rotatable about individual gear rotation axes 20, that are circumferentially spaced about the central sun gear 14 and in meshing engagement with both the central sun gear 14 and the outer ring gear 16. A central axis 22 longitudinally extends through the planetary geartrain 12.

Planetary gear carrier assembly 24 supports and retains the plurality of planetary gears 18, and generally comprises a pair of carrier plates 26 axially spaced apart by gap 28, a plurality of gear axles 34 and a planetary carrier member 40. Unlike most epicyclic gear carriers, the carrier plates 26 are generally free from gear load and act merely as an integrity-providing frame for the planetary gear carrier assembly 24. The carrier plates 26 can accordingly be substantially smaller, lighter, and generally less robust than conventional epicyclic gear carriers, as they are not required to bear much gear load. Furthermore, a single carrier plate 26 can be used. The carrier plates 26 generally comprise corresponding central apertures 30, through which the central sun gear 14 can be disposed, and a plurality of corresponding axle bores 32 which are circumferentially spaced around the generally annular carrier plates 26, radially outward from the central apertures 30. The gear axles 34 are disposed within these axle bores 32 and fastened to the carrier plates 26 using nuts 35. The gear axles 34 preferably have double roller bearings 36 thereon, within the gap 28 defined between carrier plates 26. The roller bearings 36 support the plurality of epicyclic gears 18 on the gear axles 34. To assemble the planetary gear carrier assembly 24, each subassembly, comprising a planet gear 18, roller bearings 36 and a spherical bearing 54, is first assembled and attached to one of the carrier plates 26 by one of the nuts 35. The other carrier plate 26 is then placed on top and clamped in place by nuts 35. This planet gear assembly, which is guided generally only by the sun and ring gears, is then mounted onto the carrier 40.

While five planet gears 18 are used in the described planetary gear train 12, as few as two such gears can similarly be used. More than five planetary gears 18 can also be provided, the total number employed depending largely on space and weight considerations of the gear train and/or the particular application for which it is intended to be used. However, generally five planetary gears 18 are preferably used. The present epicyclic gear carrier assembly 24 permits the epicyclic gear bearing load to be reduced without changing the gear size, as more epicyclic gears 18 can be accommodated in the same space usually required for fewer gears. The exact number of planet gears 18 is not critical. The arrangement of the present invention allows for the maximum number of gears to be employed in the given space. By linking the planet gears 18 with the carrier member 40 as describe below, the space between adjacent planet gears can be reduced to a minimum. This allows the addition of another planet gear in comparison with a conventional planetary carrier of a similar size. The additional planet gear for the same size carrier assembly results in reduced load requirements per planet gear, which means that smaller sized gears, bearings and other components can be used. These reductions in gear size, and therefore weight, more than compensate for the extra weight of the additional planet gear, and accordingly enable significant overall weight savings.

The planetary carrier member 40 has a central output element 42, a flange element 48 substantially radially extending from the central output element 42, and a plurality of axle engaging elements 50, which generally comprise axle pins 51 corresponding to the number of epicyclic gears 18 employed. The axle pins 51 are generally parallel to the longitudinal central axis 22 and define and control each individual planet gear rotation axis 20, being coaxial therewith. In particular, the axle pins 51 are sized to at least be partially inserted within the central bores 37 of the axle gears 34, and are engaged therewithin by deflection isolating load transmission members 52. In the embodiment of FIG. 2, such deflection isolating load transmission members 52 comprise preferably spherical bearings 54, fixed within the central bore 37 of the gear axles 34, thereby providing a pivotal joint between the gear axles 34 and the epicyclic carrier member 40. Such an articulated link enables torque induced deflection to be substantially limited to the axle engaging elements 50 and the flange element 48 of the planetary carrier member 40. The planet gears 18 and their axles 34 are thereby completely isolated from this twist, the gears 18 being guided and aligned by the central sun gear 14 and the outer ring gear 16.

The planetary carrier member 40 is preferably composed of a one-piece construction such that the output element 42, radially extending flange element 48, and the axle engaging elements 50, which include the axle pins 51, are all integrally formed. The central output element 42 of the epicyclic carrier member 40 comprises an inner splined diameter 44 for fixed engagement with a central output shaft element 46, which provides torque output from the epicyclic gear train 12.

Figure 3:
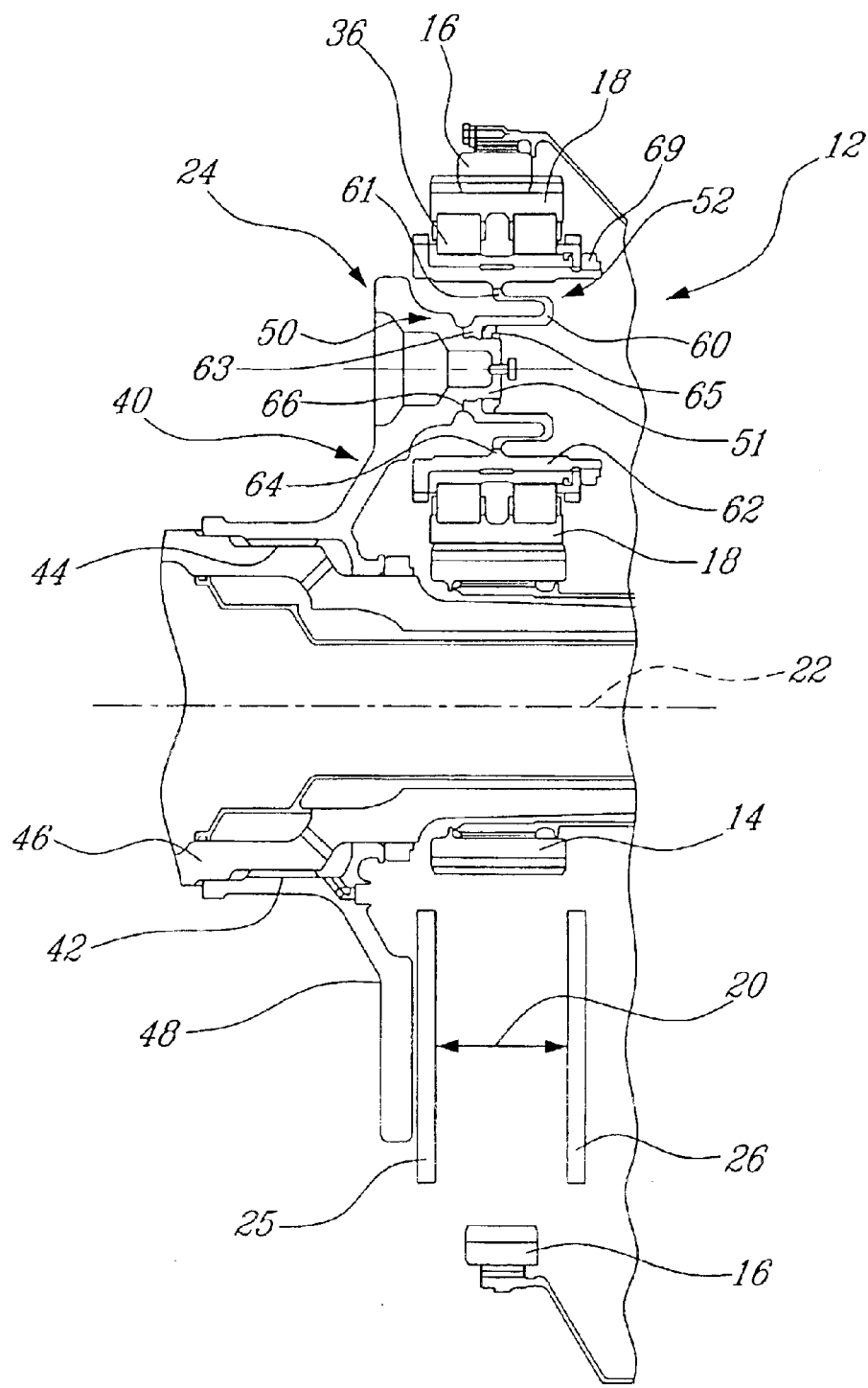
FIG. 3 is a detailed cross-sectional view of an alternate embodiment of an epicyclic gear carrier assembly according to the present invention.

Referring now to FIG. 3, the epicyclic gear carrier assembly 24 comprises an alternate deflection isolating load transmission member 52. In particular, the spherical bearing 54 of the embodiment depicted in FIG. 2 is replaced by a flexible element 60. The flexible element 60 is preferably a generally U-shaped double sleeve. However, any other structure that can be deflected such that torque load induced deflection in the remainder of the epicyclic gear carrier assembly 24 is at least significantly reduced, thereby minimizing misalignment of the meshing gear teeth. Although generally less misalignment can be absorbed by the flexible element 60 than by the spherical bearing 54 in the embodiment of FIG. 2, the flexible element 60 nevertheless provides a simpler joint which further reduces cost and weight of the assembly. The U-shaped double sleeve, flexible element 60 comprises an outer sleeve rim 61 for engagement with the gear axles 62 and an inner sleeve rim 63 for engagement with the axle pins 51 of the epicyclic carrier member 40. Preferably, the outer sleeve rim 61 is engaged with the gear axle 62 by an integral joint 64 formed therebetween. The inner sleeve rim 63 engages surface 66 formed on the outer diameter of the axle pins 51, and is fixed therein by retaining nut 65. Although the axle pins 51 are shorter in the embodiment of FIG. 3, their joint with the flexible element 60 is otherwise similar to the joint between the spherical bearing 54 and the axle pins 51 as depicted in FIG. 2. In the embodiment of the epicyclic gear carrier assembly 24 depicted in FIG. 3, the gear axles 62 are preferably integrally formed with a forward or downstream plate of the carrier plates 26. The roller bearing elements 36 disposed on the outer diameter of the gear axle 62 are fixed in place by bearing retaining nuts 69. It is, therefore, to be understood that gear axles used to support the epicyclic gears 18 of the present invention can either be integrally formed with at least one of the carrier plates 26, or can be discrete elements fastened thereto.

Figure 4:
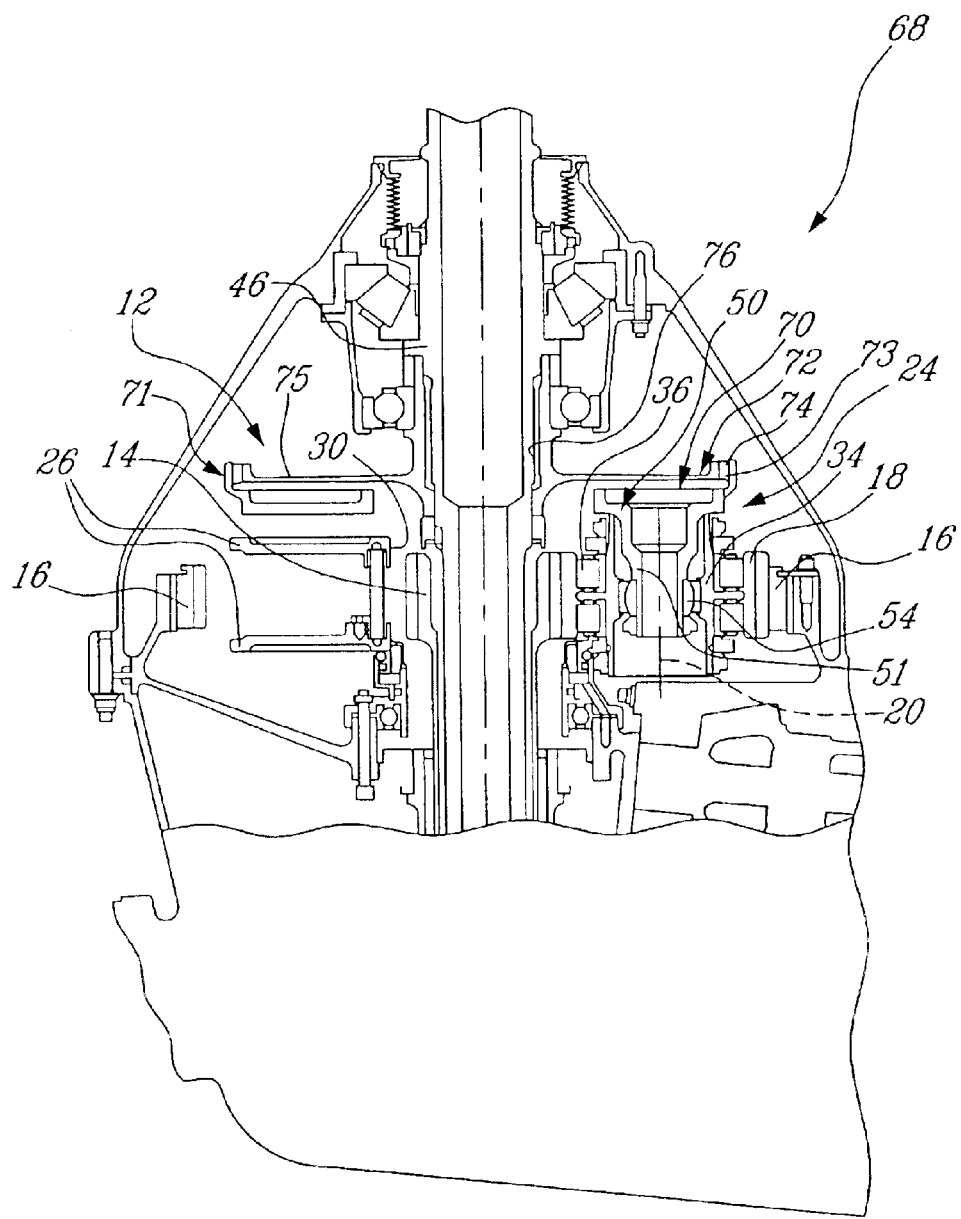
FIG. 4 is a partial cross-sectional view of a turboshaft engine gearbox having the epicyclic gear carrier assembly of FIG. 2.

Referring to FIG. 4, a turboshaft gearbox 68 is depicted having a planetary gear train portion 12 comprising the planetary gear carrier assembly 24 as depicted in FIG. 2 and described above. As previously described, the central sun gear 14, which is driven by the engine through the upstream stages of the gearbox, meshes with the plurality of epicyclic gears 18 which are disposed to rotate about individual gear rotation axes 20. The gears 18 are supported by roller bearings 36 on gear axles 34 into which axle pins 51 of an alternate epicyclic carrier member 70 are disposed. A spherical bearing 54 permits an articulated joint between the axle pins 51 and the gear axles 34, such that torque loading induced deflection can be largely absorbed by the articulated joint, permitting the epicyclic gears 18 to be completely isolated from twist. The epicyclic carrier member 70 comprises axle engaging elements 50 as per the previously described versions of the epicyclic carrier member 40. However, the alternate epicyclic carrier member 70 comprises a flange 71, radially outwardly spaced from the axle engaging elements 50, and having spline 74 thereon for engagement with an output element 72 such that relative movement between the carrier and the main rotor output shaft 46 is permitted. This provides a free spline output coupling. The output element 72 comprises a radially extending flange 75 having a splined outer surface 73 for engagement with the inner spline 74 of the outer flange 71 of the epicyclic carrier member 70. The output element 72 further comprises a radially inner output bore having an inner spline 76 therein, for engagement with the epicyclic gear train output element 46. The output element 46, in the case of the present turboshaft gearbox 68, generally provides torque output to the rotor blades of a helicopter having such a turboshaft gearbox 68.

Figure 5:
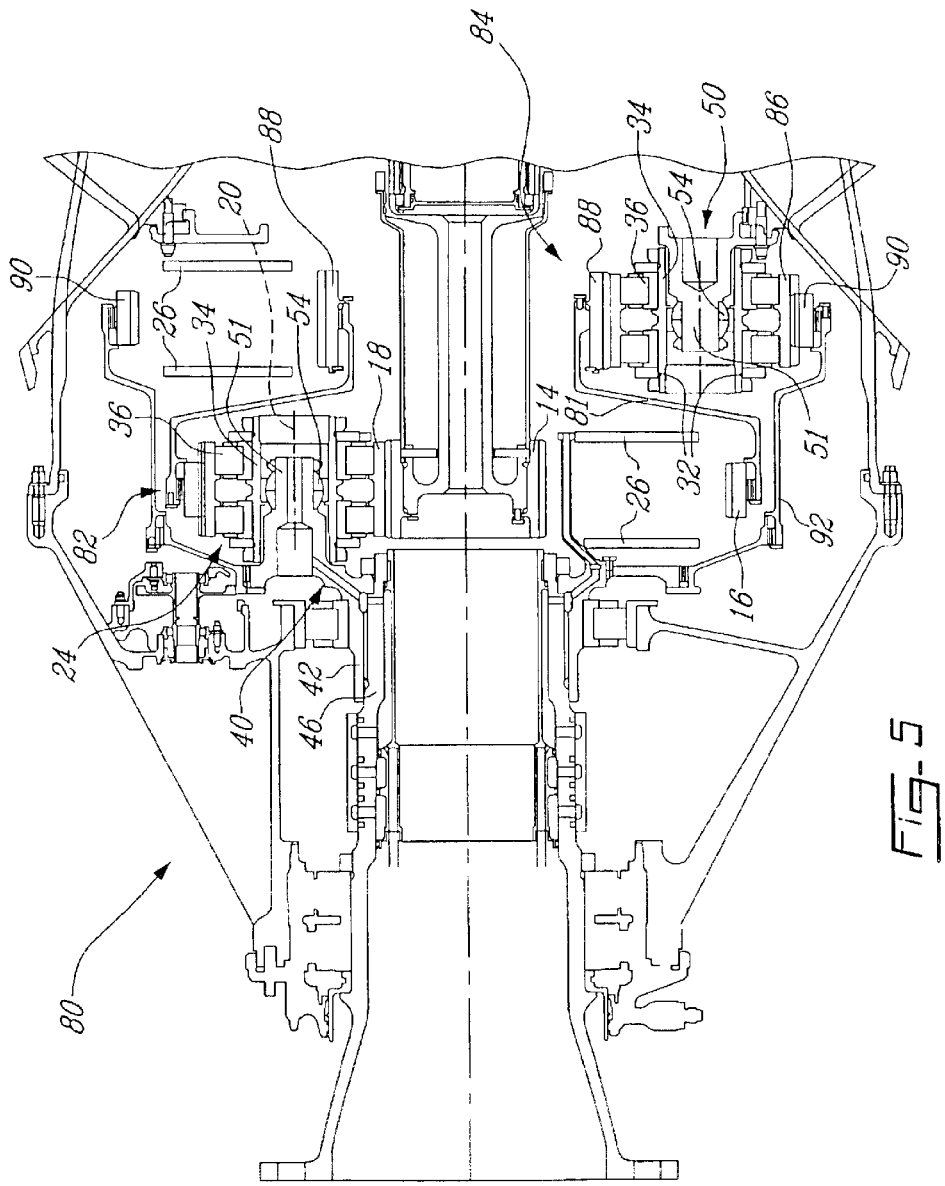
FIG. 5 is a partial cross-sectional view of a multi-stage turboprop engine gearbox having the epicyclic gear carrier assembly of FIG. 2.

Referring now to FIG. 5, a turboprop split-path gearbox 80 is depicted having first planet and second star reduction stages 82 and 84 of an epicyclic gear train, at least one stage of which comprises an epicyclic gear carrier assembly 24 according to the present invention. The first planet reduction stage 82, as previously described with regard to the general epicyclic geartrain 12 of FIG. 2, receives torque input from a central sun gear 14 which is in meshed engagement with a plurality of planet gears 18, disposed to rotate about individual gear rotation axes 20, and which are mounted to gear axles 34 by a pair of roller bearings 36. The gear axles 34 are pivotably linked with axle pins 51 of the planetary carrier member 40 by spherical bearings 54.

The planetary carrier member 40 provides torque output from the first stage 82 via the integrally formed output element 42, which is in splined engagement with the prop shaft 46. The ring gear 16 of the first reduction stage 82 is, however, permitted to rotate and is fixed via a free spline coupling 81 to the star sun gear 88 of the second star reduction stage 84. The inner ring gear 88 is in meshing engagement with a plurality of star gears 86 which, as in the first reduction stage 82, are supported by roller bearings 36 mounted on gear axles 34. The gear axles 34 are mounted in axle bores 32 disposed circumferentially between the carrier plates 26. The gear axles 34 have a central bore within which axle pins 51 of axle engaging elements 50 project, the axle pins 51 being pivotably linked with the inner diameter of the bores of the axle gears 34 by spherical bearings 54. The second star reduction stage 84 comprises a star arrangement, whereby the star carrier 50 is held stationary, such that the outer ring gear 90 provides torque output from the second reduction stage 84. The ring gear 90 is engaged with the planet carrier member 40 of the first reduction stage 82 by another free spline coupling 92. Accordingly, both stages provide torque output to the output shaft 46 of the turboprop gearbox 80. Such a split-path gearbox is advantageous due its relatively small overall size. Approximately ⅔ of the power is transmitted by the first planetary stage 82 and about ⅓ is transmitted by the second star stage 84.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present invention is intended to embrace all such alternatives, modifications and variances which fall within the scope of the appended claims.

What is claimed is:

1. An epicyclic gear carrier assembly for use in an epicyclic gear train of a gas turbine engine, said epicyclic gear train having a central axis and a plurality of epicyclic gears rotatable about individual gear axes, said epicyclic gear carrier assembly comprising:

at least a carrier plate defining a plurality of circumferentially spaced axle bores being disposed radially outward from said central axis and each axle bore being co-axial with said individual gear axes, a plurality of corresponding gear axles being disposed in substantially tight fit engagement within said axle bores and each of said epicyclic gears being rotatably mounted to a corresponding gear axle via bearing elements said carrier plate being supported by said gear axles and being mounted solely thereto; and an epicyclic carrier member comprising a plurality of axle engaging elements co-axial with said gear axles and engaged thereto by load transmission members such that load is transferred between said gear axles and said axle engaging elements while substantially bypassing said carrier plate.

2. The epicyclic gear carrier assembly as defined in claim 1, wherein said epicyclic carrier member comprises a substantially radially extending flange and an output element, and said axle engaging elements comprise axle pins axially extending from said flange.

3. The epicyclic gear carrier assembly as defined in claim 2, wherein said output element, said flange and said axle pins are integrally formed.

4. The epicyclic gear carrier assembly as defined in claim 2, wherein said axle pins are concentrically disposed within said gear axles.

5. The epicyclic gear carrier assembly as defined in claim 1, wherein said load transmission member comprises a deflection isolating element.

6. The epicyclic gear carrier assembly as defined in claim 5, wherein said deflection isolating element comprises a spherical bearing.

7. The epicyclic gear carrier assembly as defined in claim 5, wherein said deflection isolating element comprises a flexible element.

8. The epicyclic gear carrier assembly as defined in claim 6, wherein said spherical bearing defines a central axis that is co-axial with said individual gear axes.

9. The epicyclic gear carrier assembly as defined in claim 7, wherein said flexible element comprises a sleeve member.

10. The epicyclic gear carrier assembly as defined in claim 9, wherein said sleeve member is a substantially U-shaped double sleeve.

11. The epicyclic gear carrier assembly as defined in claim 9, wherein said sleeve member is integrally joined with said gear axles.

12. The epicyclic gear carrier assembly as defined in claim 1, wherein said gear axles are integrally formed with one of said carrier plates.

13. The epicyclic gear carrier assembly as defined in claim 1, wherein two carrier plates are provided, said carrier plates being axially spaced apart and defining a gap therebetween.

14. The epicyclic gear carrier assembly as defined in claim 1, wherein said carrier plates define corresponding central apertures therein, radially inward of said axle bores.

15. The epicyclic gear carrier assembly as defined in claim 1, wherein said epicyclic gear train comprises a central sun and a concentric ring gear, said plurality of epicyclic gears being circumferentially disposed between, and in meshing engagement with, said central sun gear and said ring gear.

16. The epicyclic gear carrier assembly as defined in claim 15, wherein said ring gear is fixed, such that said epicyclic gear carrier assembly rotates about said central axis, thereby providing a planetary gear train.

17. The epicyclic gear carrier assembly as defined in claim 15, wherein said epicyclic gear carrier is fixed, such that said ring gear rotates about said central axis, providing a star gear train.

18. The epicyclic gear carrier assembly as defined in claim 15, wherein one of said central sun gear and said ring gear provides torque input to said epicyclic gear carrier assembly.

19. An epicyclic gear carrier assembly comprising: at least one carrier plate defining a plurality of circumferentially spaced axle bores therethrough disposed radially outward from a central axis, a plurality of corresponding gear axles being disposed in substantially tight fit engagement within said axle bores for rotatably supporting a plurality of epicyclic gears thereon, said carrier plate being supported by said gear axles and being mounted solely thereto; and an epicyclic carrier member comprising a plurality of axle engaging elements co-axial with said gear axles and engaged thereto by load transmission members such that load is transferred between said gear axles and said axle engaging elements while substantially bypassing said carrier plate.

20. The epicyclic gear carrier assembly as defined in claim 19, wherein said epicyclic gear carrier assembly is adapted for use in an epicyclic gear train of a gas turbine engine.

21. An epicyclic gear carrier assembly for used in an epicyclic gear train of a gas turbine engine having a sun gear rotatable about a central axis, a ring gear, and a plurality of epicyclic gears each rotatable about an individual axis of rotation, said epicyclic gear carrier assembly comprising:

a plurality of gear support means each having one of said epicyclic gears rotatably mounted thereto by bearing elements such that said gear support means are co-axial with said individual axis of rotation, said gear support means being engaged to at least one carrier plate being mounted solely to said gear support means and having bores therein within which said gear support means are disposed in tight fit engagement; and an epicyclic carrier member having a plurality of circumferentially spaced gear engaging means which axially extend and are disposed radially outward from said central axis, each of said gear engaging means being co-axial with one of said gear support means and engaged thereto by a deflection isolating load transmission means, such that load is transferred between said gear support means and said gear engaging means while substantially bypassing said carrier plate.

* * * * *